United States Patent [19]
Funk

[11] 3,856,988
[45] Dec. 24, 1974

[54] SCANNING OPTICAL IMAGING SYSTEM WITH REAL-TIME IMAGE THRESHOLDING FOR THE ELIMINATION OF BACKSCATTERED LIGHT

[75] Inventor: Clarence J. Funk, San Diego, Calif.

[73] Assignee: The United States of America as represented by the Secretary of the Navy, Washington, D.C.

[22] Filed: Aug. 24, 1973

[21] Appl. No.: 391,397

[52] U.S. Cl. ...... 178/6.8, 178/DIG. 34, 350/160 LC
[51] Int. Cl. ........................................... H04m 3/12
[58] Field of Search ................. 350/160 R, 160 LC; 178/DIG. 34, 6.8

[56] References Cited
UNITED STATES PATENTS
| | | | |
|---|---|---|---|
| 3,705,955 | 12/1972 | Assoultime | 178/6.8 |
| 3,794,761 | 2/1974 | Gemchi | 178/7.2 |
| 3,796,999 | 3/1974 | Kahn | 340/173 R |

*Primary Examiner*—Howard W. Britton
*Assistant Examiner*—Edward L. Coles
*Attorney, Agent, or Firm*—Richard S. Sciascia; Ervin F. Johnston; William T. Skeer

[57] ABSTRACT

An imaging system is provided for environments where light scattering reduces image quality. The imaging system comprises a scanning illumination source to illuminate an object field. A first photoelectric transducer converts a focused image of the illuminated object field to an electric analog. A second real-time thresholding photoelectric transducer is physically and electrically connected to the first transducer to recreate an optical image of the object field having electrical analog values in excess of a predetermined value. Utilization of the optical output from the second transducer is by conventional optical or electro-optical systems.

10 Claims, 4 Drawing Figures

3,856,988

SCANNING OPTICAL IMAGING SYSTEM WITH REAL-TIME IMAGE THRESHOLDING FOR THE ELIMINATION OF BACKSCATTERED LIGHT

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of optics. More particularly, the invention pertains to the field of electro-optical imaging. In still greater particularity, the invention pertains to the field of electro-optical imaging when used in environments having high backscattering characteristics. More particularly, the invention pertains to an electro-optical imaging system to be used in underwater applications. By way of further characterization, invention pertains to an underwater electro-optical viewing system which uses real-time signal processing in connection with an electro-optical thresholding device to minimize the effects of back-scattering in an optical imaging system.

DESCRIPTION OF THE PRIOR ART

Modern ocean engineering is frequently making use of remotely controlled unmanned vehicles as well as automatic data gathering packages carried on manned submersible vehicles. The design and operation of such optical viewing systems depend upon the ability of the system to produce a clear and uncluttered image. These optical systems, like all other optical viewing systems, are limited by the intrinsic optical properties of the medium in which they are used. In case of underwater systems, the intrinsic absorption and scattering properties of the sea water provides a practical limitation for the prior art systems in these environments.

In order to overcome the backscattering properties of the sea water, sophisticated optical systems have been developed which use the techniques of range-gating and synchronous scanning to reduce the image degradation produced by these waters. Such systems, while practical in some applications, have limited utility due to their high cost, complexity and sensitivitity to temperature and mechanical vibrations.

SUMMARY OF THE INVENTION

This invention overcomes the aforementioned drawbacks of the range-gated system by employing a scanned light source in connection with a real-time image thresholding device which limits the viewing system's response to backscattered light without seriously affecting its ability to respond to the desired optical signal. The real-time thresholding device includes a liquid crystal optical element.

STATEMENT OF THE OBJECTS OF THE INVENTION

It is, therefore, an object of this invention to provide an improved imaging system.

It is another object of this invention to provide an imaging system to be used in high backscattering environments.

A further object of this invention is to provide an optical imaging system having a real-time image thresholding capability.

A further object of this invention is to provide an improved optical imaging system employing a liquid crystal optical element.

It is yet another object of this invention to provide a real-time imaging system for underwater applications which is insensitive to backscattering produced by the environment.

BRIEF DESCRIPTION OF THE DRAWINGS

The invention will be better understood with reference to the following detailed disclosure of a preferred embodiment of the invention taken in conjunction with the accompanying drawings, wherein.

DESCRIPTION OF THE PRPEFERRED EMBODIMENTS

Figure 1:
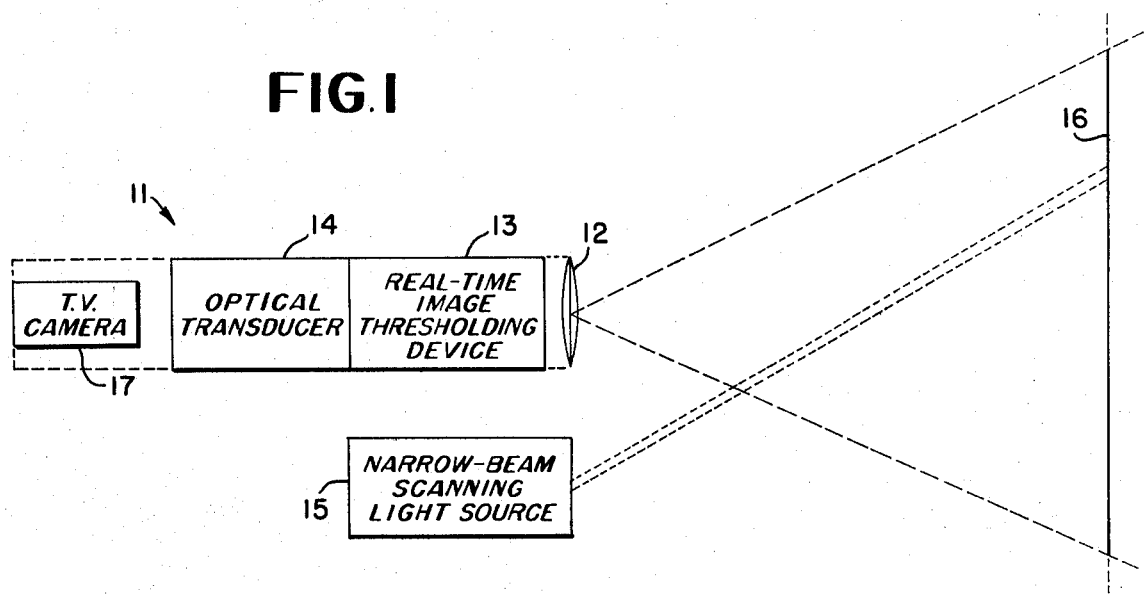
FIG. 1 is a diagrammatic showing of the optical system of the invention.

Referring to FIG. 1, a diagrammatic representation of the light modulation system according to the invention is shown at 11. As illustrated, the system includes the focusing objective lens 12, a real-time image thresholding device 13, an optical transducer 14, and a viewing system which may include a TV camera 17.

Objective lens 12 receives and focuses an image from a predetermined target zone 16 which is illuminated by a narrow-beam, scanning source of light, indicated at 15. Scanning light source 15 may be any conventional scanning illumination source as is well understood in the arts. Additionally, if desired, the narrow beam scanning light source may include sources of radiation extending slightly beyond the visible spectrum into the infrared and ultraviolet. Likewise, sources of coherent light such as lasers may be employed or light source 15, if desired. The invention will be best understood when considered as operating in environments in which considerable backscattering of the illuminating light source occurs between objective 12 and target zone 16. For example, the system may be used in an underwater environment and may be mounted on a remotely controlled vehicle in the manner described in the inventor's copending patent application for "Pan and Tilt Underwater Optical Viewing System With Adjustable Source Receiver Separation and Zoom Lenses," Ser. No. 227,635 issued on Sept. 4, 1973 as U.S. Pat. No. 3,757,042.

Figure 2:
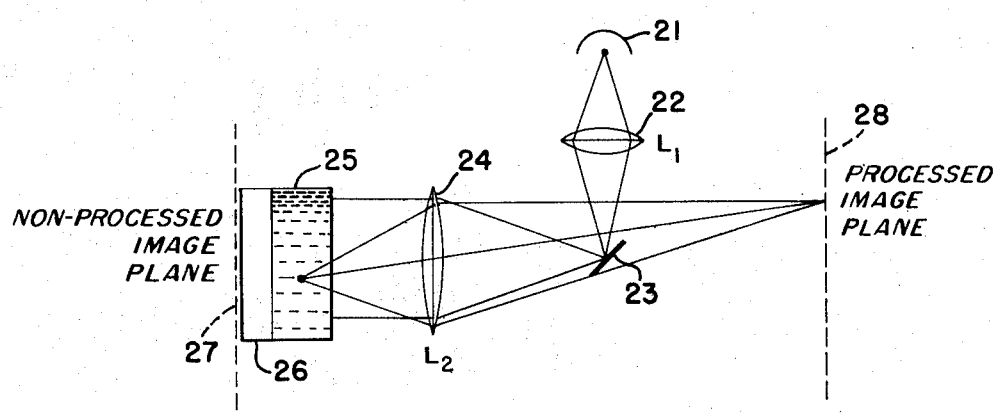
FIG. 2 is a diagrammatic showing of the optical elements and their interrelation of the real-time image thresholding device illustrated in FIG. 1.

Referring to FIG. 2, the details of the real-time image thresholding device 13 and optical transducer 14 may be better understood. Considering the entire structural assembly as a unitary subsystem, it will be observed that the light from an illumination source 21 is focused by means of a lens 22, a mirror 23, and a lens 24 to impinge a liquid crystal assembly 25 so as to be retroreflected by a specular conducting electrode on the rear face of an electro-optical transducer 26.

As the name implies, the liquid crystal is a chemical compound and mixtures thereof which exhibit physical characteristics some of which are associated with liquids while others are associated with solid crystals. As an example, liquid crystals contain a fluid which exhibits viscosities and flow-characteristics ordinarily associated with liquids. These compounds and mixtures of compounds are optically transparent in their natural state. However, when subjected to the influence of an electric field, they become less transparent and cause a scattering of the light passed through them similar to the defraction characteristics associated with solid crystals.

A number of chemical compounds, mixtures thereof, and suitable constructions for liquid crystals satisfactory for utilization in the present invention are known in the prior art. For example, those described in U.S. Pat. No. 3,707,322 issued on Dec. 26, 1972 to Joseph J. Wysocki et al., for "Electrostatic Latent Imaging System Using a Cholesteric to Nematic Phase Transition" and those similarly listed in U.S. Pat. No. 3,722,998 issued on Mar. 27, 1973 to John E. Morse for "Liquid Crystal Apparatus for Reducing Contrast" are indicative of the structures available.

Similarly, photoelectric transducer 26 may be of a state-of-the-art construction and, in developmental models, may comprise a layer of photoconductive cadium sulfide, CdS.

Objective lens 12 produces an image of target zone 16 on a non-processed image plane, indicated at 27, on the photo-active surface of photoelectric transducer 26. In the well understood fashion, an electrical charge analog of this image is produced by photoelectric transducer 26 on the rear surface thereof where it provides energization potential for the liquid crystal 25. The energized zones of liquid crystal 25 cause the light from source 21 to be defracted so as to appear to emanate from within liquid crystal 21 in a divergent fashion. These optical rays are focused by lens 24 onto a processed image plane 28 rather than being retroreflected to source 21 as in the case of light energy passing through a non-activated portion of liquid crystal 25.

Figure 3:
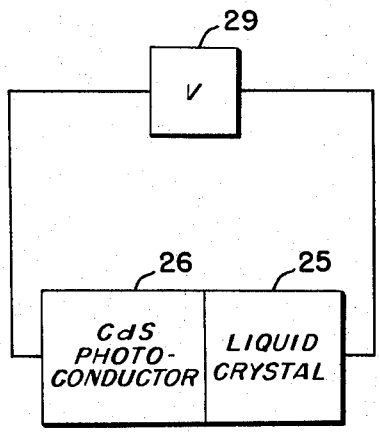
FIG. 3 is an electrical block diagram showing the interconnection of elements illustrated in FIG. 2.

Referring to FIG. 3, a schematic electrical diagram is shown to indicate a simple circuit relationship between photoelectric transducer 26 and liquid crystal 25. As illustrated the physical and eletrical proximity of the two elements result in a series circuit which is connected to a voltage source indicated at 29. Voltage source 29 may be a battery or any other convenient source of operating potential. When, as shown in FIG. 1, the utilizing viewing system includes a TV camera, this operating potential 29 may be a part of the internal power supply of the camera 17.

As is understood in the photoelectrical arts, the energization of liquid crystal 25 from the transparent to diffusing mode requires a certain predetermined potential. This potential is determined by a variety of conditions including the composition of the lens, the thickness of the lens, the operating temperature of the system, and other electro-physical parameters. Similarly, the electro-optical properties of the photoconductive electro-optical transducer 26 are well understood in the electro-optical arts and by choice of the appropriate thickness and size of transducing layer, liquid crystal 25 may be activated by a predetermined light intensity impinging photoelectric transducer 26.

Figure 4:
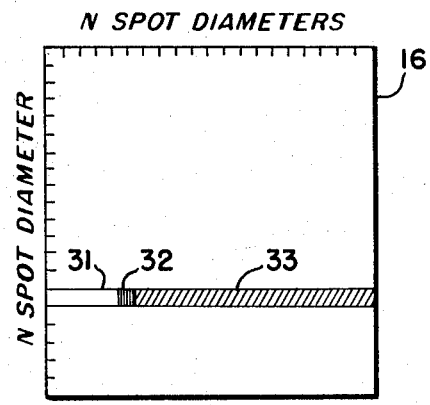
FIG. 4 is a schematic illustration of the unprocessed image plane illustrated in FIG. 2.

In this fashion, light returning to the system from a target 16 which has a higher energy concentration than that being returned due to backscattering from the volume of space between illumination source 15, FIG. 1, and the target 16. This condition is diagrammatically illustrated in FIG. 4. As shown, target area 16 is being scanned in a strip by strip fashion by a spot of light from light source 15. This spot of light shown at 32 in FIG. 4 may be considered to scan a strip indicated generally at 31. As light spot 32 moves across strip 31 a return is obtained from targets within the target zone as well as a reduced intensity backscattering, indicated at 33 from particulate matter within the space between light source 15 and the target 16.

Preferred Mode of Operation

The operation of a system of the invention is essentially the cooperative and composite operation inherent in each of the subsystems comprising the invention. Thus, narrow beam scanning light source 15 scans a target 16 by means of conventional scanning optics such as rotating and rocking mirrors, for example. This illumination activity causes light to be reflected from target 16 which is focused by a non-scanning objective 12 on a non-processed image plane 17. The light incident of this small area of the photoelectric transducer which may be, as noted above, a cadium sulfide cell, changes the conductivity of the cell at that point. This increases the voltage over the adjacent area of liquid crystal 25. Because the onset of defraction within this area of liquid crystal 25 has a voltage threshold, the light incident in the non-processed image plane only produces localized areas of defractive activity in the liquid crystal at those points for which the irradiance is greater than this threshold value. Thus, the energization produced by the lesser intensity backscattered light will be insufficient to activate the liquid crystal 25. Because of this differential in liquid crystal activation, the image recreated at the processed image plane at 28 by means of lens 24 will not contain a component corresponding to the backscattered energy.

As will be readily apparent, the success of the system will be dependent upon liquid crystal 25 having a very rapid rise time and decay from electrical stimulation. In order to minimize this time, care must be exercised in the selection of the liquid crystal material and its physical construction. Particularly, attention to the thickness of the liquid crystal is important.

The light energy defracted by the activation of liquid crystal 25 is focused by lens 24 on a processed image plane 28. Although lens 24 is illustrated as a simple lens, it will be readily understood that focusing systems using a plurality of lens elements may be used for lens 24. Similarly, lens 12 and 22 may also comprise composite optical elements.

As will be recognized by those versed in the optical arts, the design of an optical system 14 is a compromise between its dual function in the focusing system of the defracted light emanating from the activated regions of liquid crystal 25 and its use in the retroreflective system which returns undefractive light energies to light source 21. Since these properties of lens design are well understood and are the subjects for separate invention, a further description is unnecessary for the understanding of the mode of operation of the invention.

However, it should be noted that the processed image, focused at process image plane 28 need not be of very high intensity if it is examined by other electro-optical viewing means, such as TV camera 17, since the gain of these devices is capable of separate adjustment.

The foregoing description taken together with the appended claims constitutes a disclosure such as to enable a person skilled in the electronic and electro-optical arts and having the benefit of the teachings contained therein to make and use the invention. Further, the structure herein described meets the objects of the invention and generally constitutes a meritorious advance in the art unobvious to such a skilled worker not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A light modulation system to recreate an image field comprising:
    illuminating means for illumination of a field object zone;
    optical imaging means for providing an image of said field object zone;
    first photoelectric transducer means positioned with respect to said optical imaging means to receive the image produced thereby for producing electrical analog signal of the image;
    threshold means connected to said transducer means having a plurality of discreet areas for independently responding to electrical analog signal components having predetermined intensity characteristics;
    optical transducer means connected to said threshold means and positioned to create an optical analog of the signals to which said threshold means has responded for recreating an optical image of only a predetermined portion of the original image; and
    viewing means positioned with respect to said second photoelectric transducer means for utilizing the optical image recreated by said second photoelectric transducer means.

2. A light modulation system according to claim 1 in which said first photoelectric transducer means is a photoconducting type transducer.

3. A light modulation system according to claim 1 in which said threshold means includes a liquid crystal in physical and electrical contact with said first photoelectric transducer.

4. A light modulation system according to claim 1 in which said optical transducer means includes a retroreflective optical illumination system having a light source and image forming means and being optically positioned to illuminate said threshold means and to return light reflected from non-responsive areas thereof to the light source while returning light reflected from responsive areas to the image forming means to provide an optical output signal from the optical transducer means.

5. A light modulation system according to claim 1 in which said illuminating means includes a scanning source of light which traverses the field object zone in a predetermined time period with narrow beam of light.

6. A light modulation system according to claim 5 in which said narrow beam of light is a coherent energy beam.

7. A light modulation system according to claim 6 in which said first photoelectric transducer means is a photoconducting type transducer.

8. A light modulation system according to claim 7 in which said threshold means includes a liquid crystal in physical and electrical contact with said first photoelectric transducer.

9. A light modulation system according to claim 8 in which said optical transducer means includes a retroflective optical illumination system having a light source and image forming means and being optically positioned to illuminate said threshold means and to return light reflected from non-responsive areas thereof to the light source while returning light reflected from responsive areas to the image forming means to provide an optical output signal from the optical transducer means.

10. A light modulation system according to claim 9 in which the aforesaid viewing means includes a closed circuit television system including a camera which is physically and optically positioned to receive the optical output signal from the optical transducer means, whereby an image is transmitted therefrom which corresponds to the portions of the aforesaid field object image having the predetermined image intensity characteristics.

* * * * *